US009994060B2

(12) United States Patent
Yamada et al.

(10) Patent No.: US 9,994,060 B2
(45) Date of Patent: Jun. 12, 2018

(54) PAGE PRESSING APPARATUS AND DOCUMENT CAMERA SYSTEM

(71) Applicant: CASIO COMPUTER CO., LTD., Shibuya-ku, Tokyo (JP)

(72) Inventors: Shota Yamada, Hino (JP); Naoto Imamura, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/220,921

(22) Filed: Jul. 27, 2016

(65) Prior Publication Data

US 2017/0072731 A1  Mar. 16, 2017

(30) Foreign Application Priority Data

Sep. 15, 2015 (JP) .................................. 2015-181495

(51) Int. Cl.
*B42D 9/04* (2006.01)
*H04N 5/225* (2006.01)
*H04N 5/232* (2006.01)

(52) U.S. Cl.
CPC ............. *B42D 9/04* (2013.01); *H04N 5/2251* (2013.01); *H04N 5/232* (2013.01)

(58) Field of Classification Search
CPC .................................... B42D 9/04; B42D 9/06
See application file for complete search history.

(56) References Cited

U.S. PATENT DOCUMENTS

| 4,102,071 | A | * | 7/1978 | D'Arcy | B42D 9/04 40/531 |
| 4,644,675 | A | * | 2/1987 | Berger | B42D 9/04 271/21 |
| 4,685,374 | A | * | 8/1987 | Goldner | B42D 9/06 40/470 |
| 2004/0016337 | A1 | * | 1/2004 | McNab | B42D 9/06 84/486 |
| 2014/0366412 | A1 | * | 12/2014 | Hasegawa | B42D 9/04 40/530 |
| 2015/0375557 | A1 | * | 12/2015 | Hasegawa | B42D 9/04 358/498 |

(Continued)

FOREIGN PATENT DOCUMENTS

JP         05155179 A    6/1993
JP       2014058053 A    4/2014

*Primary Examiner* — Gary C Hoge
(74) *Attorney, Agent, or Firm* — Holtz, Holtz & Volek PC

(57) ABSTRACT

In order to prevent a page from returning from a page-turning end point to a page-turning start point and improve the reliability of page turning, in addition to a catching section having a plurality of vane sections provided on the outer circumferential surface, there are provided a pull-in roller which rotates around the rotation axis of the catching section and has a diameter smaller than that of the catching section and a pressing roller having a diameter smaller than that of the pull-in roller. When a page is conveyed by a sticking section, the catching section brings the page to a page-turning end point while rubbing the page surface with the rotating vane sections, and the pull-in roller pulls in the page caught by the vane sections of the catching section. The pressing roller presses the page pulled in by the pull-in roller at the page-turning end point.

20 Claims, 19 Drawing Sheets

(56) References Cited

U.S. PATENT DOCUMENTS

2016/0167419 A1\* 6/2016 Hasegawa ................ B42D 9/06
                                                  281/15.1
2016/0347107 A1\* 12/2016 Hashimoto ............. B42D 9/04
2017/0036476 A1\* 2/2017 Imamura .................. B42D 9/06
2017/0099404 A1\* 4/2017 Hasegawa ................ B42D 9/04

\* cited by examiner

PAGE PRESSING APPARATUS AND DOCUMENT CAMERA SYSTEM

CROSS-REFERENCE TO RELATED APPLICATION

This application is based upon and claims the benefit of priority from the prior Japanese Patent Application No. 2015-181495, filed Sep. 15, 2015, the entire contents of which are incorporated herein by reference.

BACKGROUND OF THE INVENTION

1. Field of the Invention

The present invention relates to a page pressing apparatus and a document camera system.

2. Description of the Related Art

Conventionally, as an apparatus that automatically turns pages of a book or the like, an apparatus is known which turns pages by sticking to overlapping pages one by one, as disclosed in Japanese Patent Application Laid-Open (Kokai) Publication No. 05-155179.

SUMMARY OF THE INVENTION

In accordance with one aspect of the present invention, there is provided a page pressing apparatus comprising: a first roller which rotates around a rotation axis, and presses a page fed to a page-turning end point, with a predetermined pressing load; and a catching section which catches the page so as to feed the page to the page-turning end point by causing a plurality of vane sections arranged around the rotation axis to rotate around the rotation axis.

In accordance with another aspect of the present invention, there is provided a document camera system comprising: a page turning apparatus which turns pages of a book in a double-page spread state; a page pressing apparatus including a roller which rotates around a rotation axis and presses a page fed to a page-turning end point with a predetermined pressing load, and a catching section which catches the page so as to feed the page to the page-turning end point by causing a plurality of vane sections arranged around the rotation axis to rotate around the rotation axis; and a control apparatus which repeats an operation of controlling an imaging section to photograph a page of the book in synchronization with timing of turning the page.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

A. First Embodiment

Figure 1:
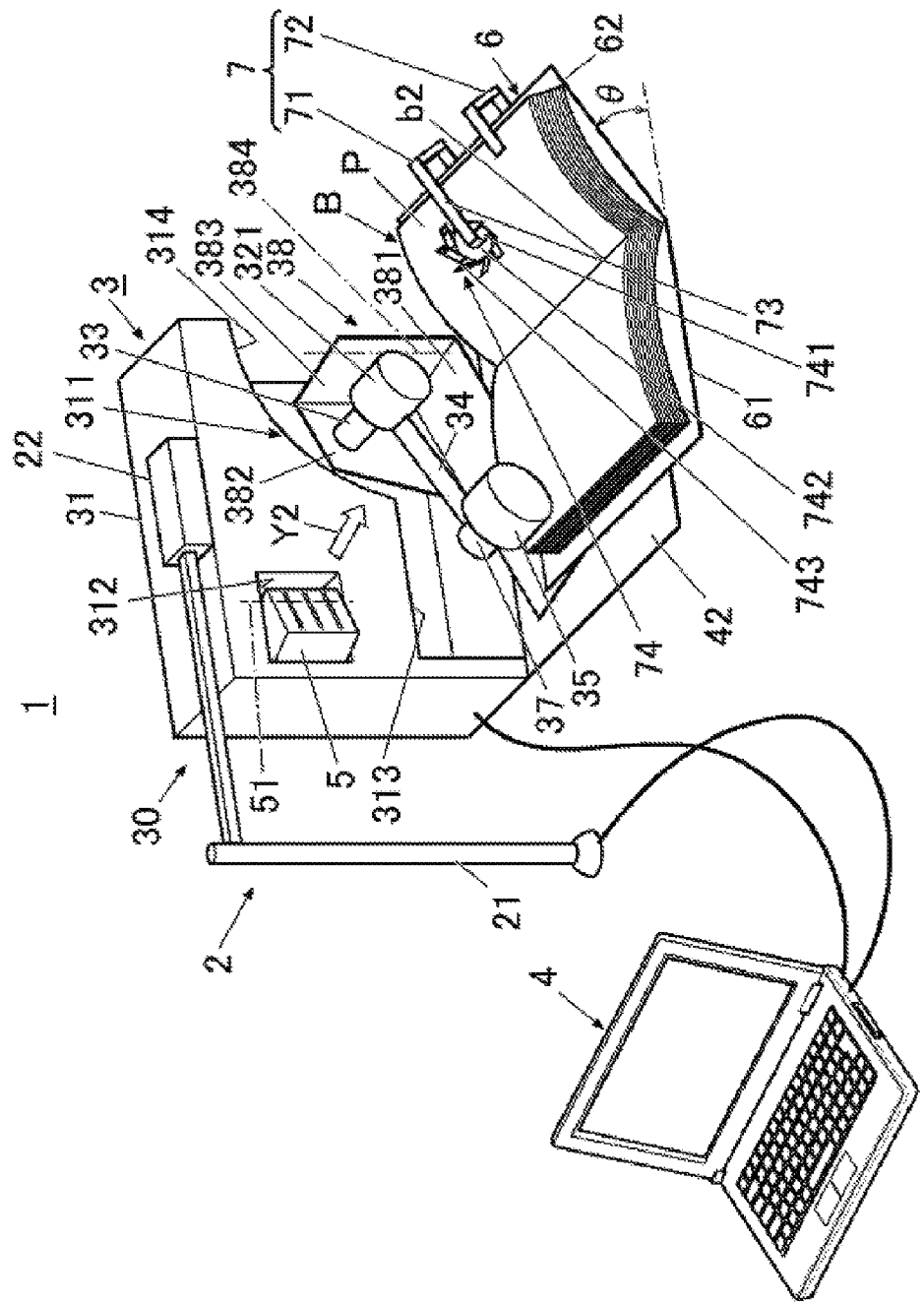
FIG. 1 is a perspective view showing a schematic structure of a document camera system according to an embodiment.

An embodiment of the present invention will hereinafter be described with reference to the accompanying drawings. Note that, although the embodiment described below is provided with various technically preferable limitations in order to carry out the present invention, these limitations are not intended to limit the scope of the present invention to the embodiment and examples shown in the drawings.

FIG. 1 is a perspective view showing the schematic structure of a document camera system according to the first embodiment. Note that in the following descriptions a case is exemplarily described in which pages of a book are turned from left to right.

A document camera system 1 in FIG. 1 includes a document camera 2 as imaging means for photographing pages P of a book B, a page turning apparatus 3 which turns pages P of the book B, and a personal computer 4 which is connected to the document camera 2 and the page turning apparatus 3 such that it can communicate with them.

The document camera 2 is provided with a stand section 21 and a camera 22 attached to the upper end of the stand section 21. The stand section 21 is tiltable in the front-and-back direction and the right-and-left direction and is vertically extendable so that the relative positional relationship between the book B and the camera 22 can be adjusted. The lens of the camera 22 is oriented downward so that the book B is within the viewing angle of the lens. In the joint portion between the camera 22 and the stand section 21A, a positioning mechanism is provided, whereby the orientation of the lens of the camera 22 can be adjusted.

The page turning apparatus 3 includes a holding table 6 which holds the opened book B, a page turning apparatus body 30 which holds a page P of the book B on the holding table 6 at a page-turning start point and releases the page P at a page-turning end point, and a page holding section 7 which holds the page P at the page-turning end point.

The holding table 6 includes a pair of holding plates 61 and 62 which is foldable by a hinge (not shown). In this embodiment, in a case where the pages P of the book B are turned from left to right, one holding plate 61 of the pair of holding plates 61 and 62 which is located on the left side is placed along the surface of the table, and the other holding plate 62 located on the right side is placed obliquely upward on the table at a predetermined tilt angle with respect to the holding plate 61. On the holding plate 61, Pages P that serve as a page-turning start point of the book B are placed. On the other holding plate 62, pages P that serve as a page-turning end point of the book B are placed.

Accordingly, the holding table 6 holds the book B such that the pages P at the page-turning end point tilt in a direction to rise with a seam b2 of the book B as an axis, as compared to the pages P at the page-turning start point. Note that, since the pair of holding plates 61 and 62 is foldable by the hinge, an angle between the pair of holding plates 61 and 62 can be adjusted and a tilt angle θ with respect to the horizontal plane of a page P at the page-turning end point can be freely adjusted. This tilt angle θ should preferably be adjusted in the range of 30° to 45°.

Figure 2:
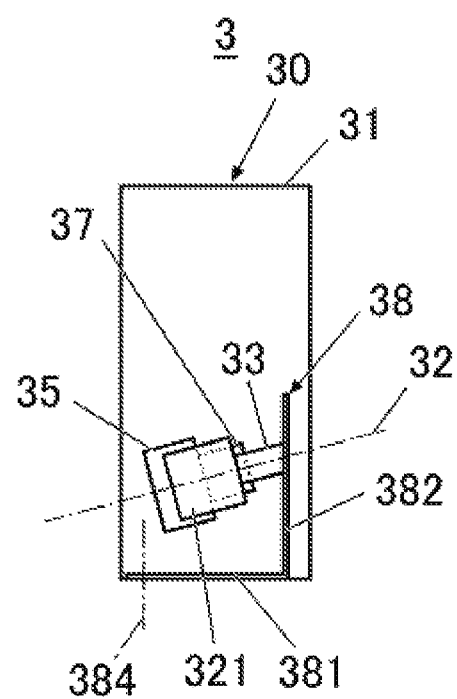
FIG. 2 is a side view schematically showing the internal arrangement of a page turning apparatus according to the embodiment.

FIG. 2 is a side view schematically showing the internal structure of the page turning apparatus 3.

As shown in FIGS. 1 and 2, the page turning apparatus body 30 includes an accommodation case 31 having a substantially rectangular parallelepiped shape, a first driving section (driving section) 33 such as a motor having a driving shaft 32, an arm section 34 which swings around the driving shaft 32, a sticking section 35 which is attached to a distal end of the arm section 34 and sticks to a page P of the book B, a pedestal section 38 which supports the first driving section 33, the arm section 34, and the sticking section 35, an air blowing section 5 which blows air against a page P at a page-turning end point by making air pass above a page P at a page-turning start point, and a control section 36 (not shown) (see FIG. 10) which controls the respective sections. The first driving section 33, the arm section 34, and the sticking section 35 constitute a turning mechanism according to the present invention.

The accommodation case 31 accommodates the first driving section 33, the arm section 34, the sticking section 35, the pedestal section 38, the air blowing section 5, and the control section 36. The main surface of the accommodation case 31 is provided with a first accommodation concave recess 311 for accommodating the first driving section 33, the arm section 34, the sticking section 35, and the pedestal section 38, and a second accommodation concave recess 312 for accommodating the air blowing section 5. Note that the control section 36 is accommodated in the accommodation case 31 in a manner not to be exposed.

The first accommodation concave recess 311 includes a first concave section 313 for accommodating the arm section 34 when the arm section 34 is not being used and a second concave section 314 formed in a manner not to interfere with the operation of the arm section 34 when it swings. The first concave section 313 is formed into a rectangular shape along the bottom portion of the accommodation case 31. The second concave section 314 is continuously formed from one end portion of the first concave section 313 into a sector shape, and a side portion of which is open.

The second accommodation concave recess 312 is formed into a rectangular shape above the first concave section 313.

The pedestal section 38 is provided such that it can be rotationally moved in a horizontal direction in the first accommodation concave recess 311. This pedestal section 38 is provided with a bottom plate 381, a support section 382 which extends upright from one side of the bottom plate 381 which is located on the back side and supports the first driving section 33, and a stopper 383 which extends upright from one end portion of the bottom plate 381 and is adjacent to the support section 382. One end portion of the bottom plate 381 is provided with a rotary shaft 384 (see FIG. 1) which makes the pedestal section 38 horizontally rotatable. The driving shaft 32 of the first driving section 33 supported by the support section 382 is also arranged on one end portion side of the bottom plate 381. In other words, the rotary shaft 384 of the pedestal section 38 is arranged on the driving shaft 32 side.

Figure 3:
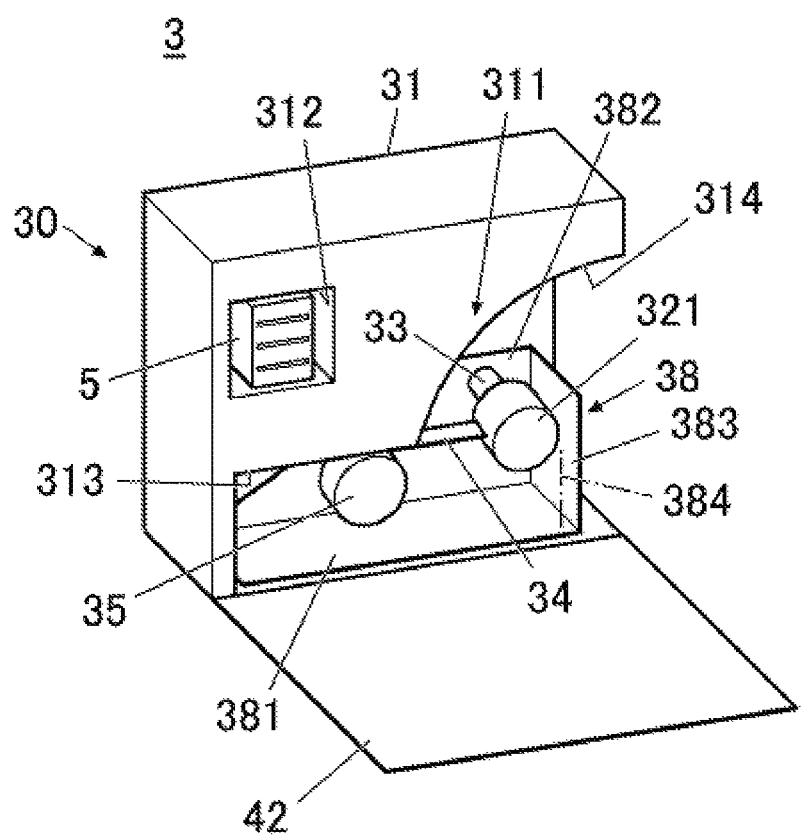
FIG. 3 is a perspective view showing a state where a pedestal section has been accommodated in an accommodation case according to the embodiment.

FIG. 3 is a perspective view showing a state in which the pedestal section 38 has been accommodated in the accommodation case 31. In FIG. 1, a state (operating state) is shown in which the pedestal section 38 has been pulled out of the accommodation case 31. In this state, when the pedestal section 38 is rotationally moved around the rotary shaft 384 toward the accommodation case 31, the first driving section 33, the arm section 34, the sticking section 35, and the pedestal section 38 are accommodated in the first accommodation concave recess 311, as shown in FIG. 3.

Also, the lower end portion of the accommodation case 31 is provided with a lid section 42 which is openable by a hinge (not shown). The lid section 42 in an opened state is positioned on the desk, and the holding table 6 is arranged on the lid section 42, as shown in FIG. 1.

When the first driving section 33, the arm section 34, the sticking section 35, and the pedestal section 38 are accommodated in the first accommodation concave recess 311, and the lid section 42 is closed, the first driving section 33, the arm section 34, the sticking section 35, and the pedestal section 38 are covered and hidden.

As shown in FIG. 2, in the operating state, the driving shaft 32 of the first driving section 33 tilts toward the book B. When the driving shaft 32 is rotated, the arm section 34 reciprocates between a page-turning start point of the pages P and a page-turning end point of the pages P as if it draws an arc centered on the driving shaft 32. In the following descriptions, a movement from a page-turning start point of the pages P to a page-turning end point of the pages P is regarded as a forward movement, and a movement from the page-turning end point to the page-turning start point is regarded as a backward movement.

Next, the structure of the arm section 34 and the sticking section 35 is described in detail.

As shown in FIGS. 1 and 2, a rotating body 321 is attached to a distal end portion of the driving shaft 32, and the arm section 34 is attached to the rotating body 321 in a manner to extend along a horizontal plane perpendicular to the driving shaft 32. The arm section 34 is, for example, a rectangular plate-like member made of resin, and a sectional portion of the arm section 34 which is perpendicular to the longitudinal direction has a flat plate-like shape. The sticking section 35 is attached to a distal end of the arm section 34 through a second driving section 37 such as a motor.

The second driving section 37 is arranged such that a driving shaft 39 (see FIG. 5) extends along a direction perpendicular to the longitudinal direction of the arm section 34. The sticking section 35 is detachably attached to the driving shaft 39. As the driving shaft 39 rotates, the sticking section 35 rotates.

The sticking section 35 is a substantially columnar adhesive section, and includes a columnar rotating roller and an adhesive member wrapped around the rotating roller.

Here, there is a demand to improve the replacement efficiency of the sticking section 35 with respect to the driving shaft 39 of the second driving section 37. For this reason, a rotating roller is formed from an elastic body such as sponge, and the driving shaft 39 is fitted into a central portion of this elastic body. Elastic bodies other than sponge include rubber and foam. Accordingly, at the time of replacement, the rotating roller can be detached by only being pulled out of the driving shaft 39. As described above, since the rotating roller is an elastic body, the sticking section 35 can be easily attached to or detached from the driving shaft 39, which facilitates the replacement.

When the arm section 34 is to be moved forward by a page turning operation, since a page P at a page-turning start point has been stuck to the sticking section 35, this page P moves to a page-turning end point along with the forward movement of the arm section 34.

Also, in a backward movement, the travelling direction is reverse to the direction of the forward movement. Here, the sticking section 35 moves along the same path while being separated from the page P, and finally sticks to a new page P at the page-turning start point. By this reciprocating operation being repeated, the operation of turning pages P is continued.

Figure 4:
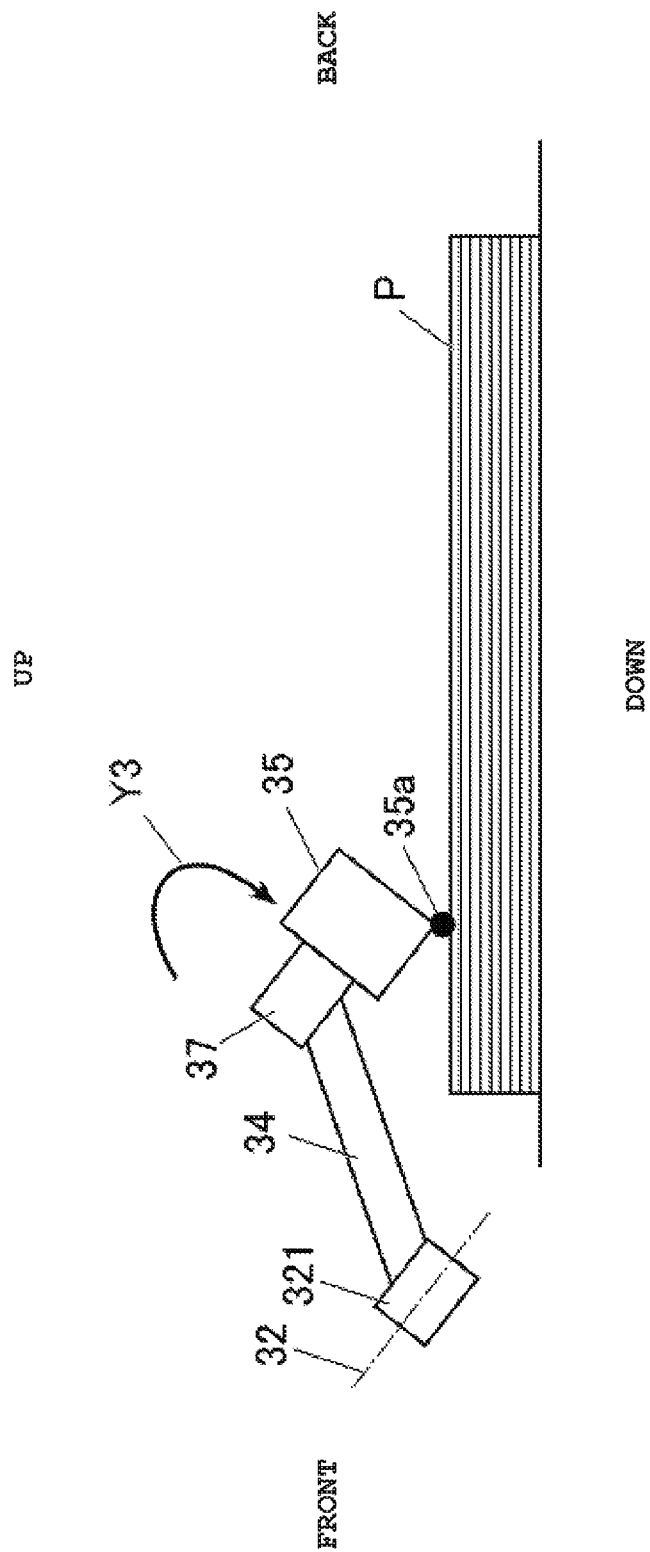
FIG. 4 is a schematic view showing an initial state in which a sticking section according to the embodiment is in contact with a page at a page-turning start point.

FIG. 4 is a schematic view showing an initial state when the sticking section 35 comes in contact with a page P at a page-turning start point.

As shown in FIG. 4, first, when the arm section 34 swings in an arrow Y3 direction and the sticking section 35 comes in contact with a page P at a page-turning start point, the effective surface (adhesive surface) of the sticking section 35 comes in contact with the page P obliquely. More specifically, the lengths, angles, attachment positions, and the like of the driving shafts 32 and 39 and the arm section 34 are set in advance such that part of a circumferential portion 35a of one bottom surface of the substantially columnar sticking section 35 comes in contact with a page P obliquely. Note that the effective surface of the sticking section 35 is an outer circumferential surface formed from a generating line. When the effective surface is obliquely in contact with a page P, since the contact area to the page P is small at the beginning of the contact, a high pressure acts on the page P, whereby the sticking section 35 can unfailingly stick (adhere) to the page P.

Figure 5:
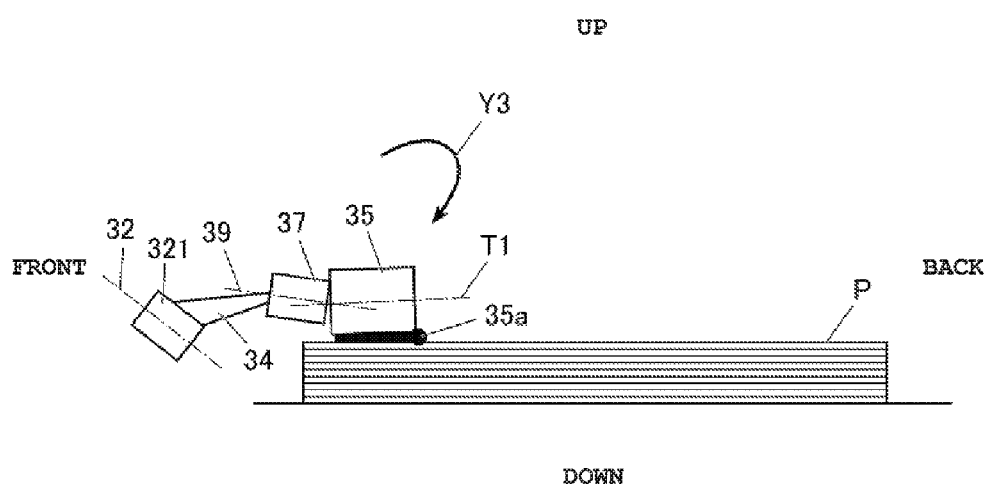
FIG. 5 is a schematic view showing a state in which an arm section has further swung from the state shown in FIG. 4.

FIG. 5 is a schematic view showing a state in which the arm section 34 has further swung from the state shown in FIG. 4. In a state where the sticking section 35 has just come in contact with a page P at a page-turning start point, the swing of the arm section 34 has not stopped, and the first driving section 33 keeps moving the arm section 34 in the arrow Y3 direction. Here, since the sticking section 35 is still in contact with the page P, the arm section 34 is twisted around an axis parallel to the longitudinal direction. In addition, the driving shaft 39 fitted into the rotating roller made of an elastic body is twisted from the center T1 of the rotating roller, and the sticking section 35 comes in close contact with the page P along the generating line (a given width including it), whereby the effective surface of the sticking section 35 comes in close contact with the page P with an area larger than that immediately after the contact.

Figure 6:
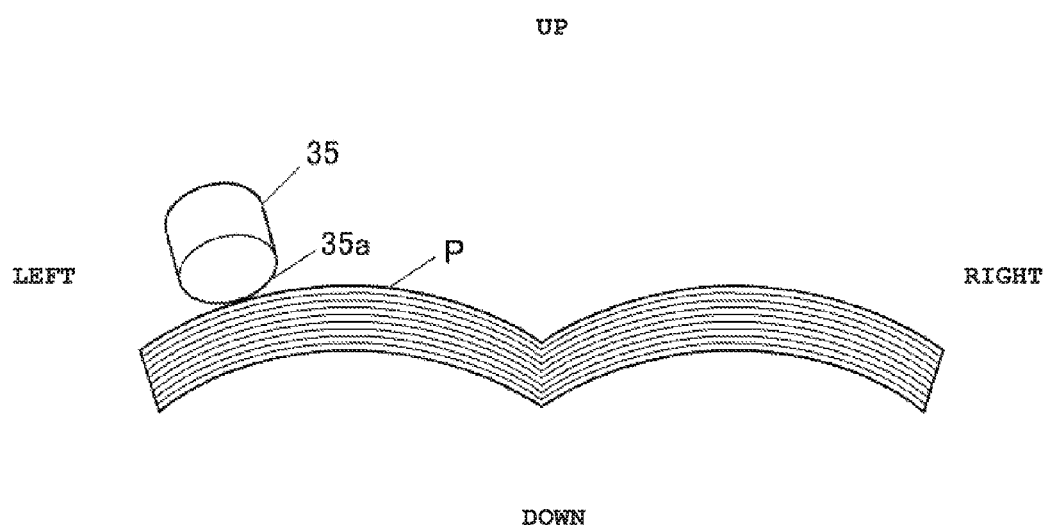
FIG. 6 is a schematic view showing the state shown in FIG. 4 when viewed from the front.

FIG. 6 is a schematic view showing the state shown in FIG. 4 when viewed from the front. As shown in FIG. 6, even when the page P at the page-turning start point is curved, if the effective surface of the sticking section 35 obliquely comes in contact with the page P, the contact area to the page P is small at the beginning of contact, so that a high pressure can be applied to the page P, and the sticking section 35 can unfailingly stick to the page P.

As described above, the sticking section 35 operates in two steps to stick to a page P, and therefore can unfailingly stick to the page P.

As shown in FIG. 1, the air blowing section 5 is arranged on the upper flow side of a page-turning start point of the book B. For example, in a structure where a page P of the book B is turned from left to right as in this embodiment, the air blowing section 5 is arranged on the left side of pages P at a page-turning start point of the book B. The air blowing section 5 is axially and rotatably supported by a rotary shaft 51 such that it can be rotationally moved in a horizontal direction in the second accommodation concave recess 312, whereby the blowing direction of air can be freely adjusted. Note that, as long as the blowing direction of air can be freely adjusted, the air blowing section 5 may have two or more rotary shafts instead of one. In a structure where the air blowing section 5 has two shafts, it should preferably be capable of rotating in horizontal and vertical directions. In addition, the air blowing section 5 may be mounted in the second accommodation concave recess 312 by using a mechanism with an unfixed rotation axis such as a pivot mechanism. Alternatively, the blowing direction of air may be adjusted by using a variable louver with the air blowing section 5 being fixed.

The page holding section 7 (see FIG. 1) includes a catching section 71 which brings a page P to a page-turning end point so as to prevent it from returning to a page-turning start point and a clip section 72 which holds the page P at the page-turning end point.

Figure 7:
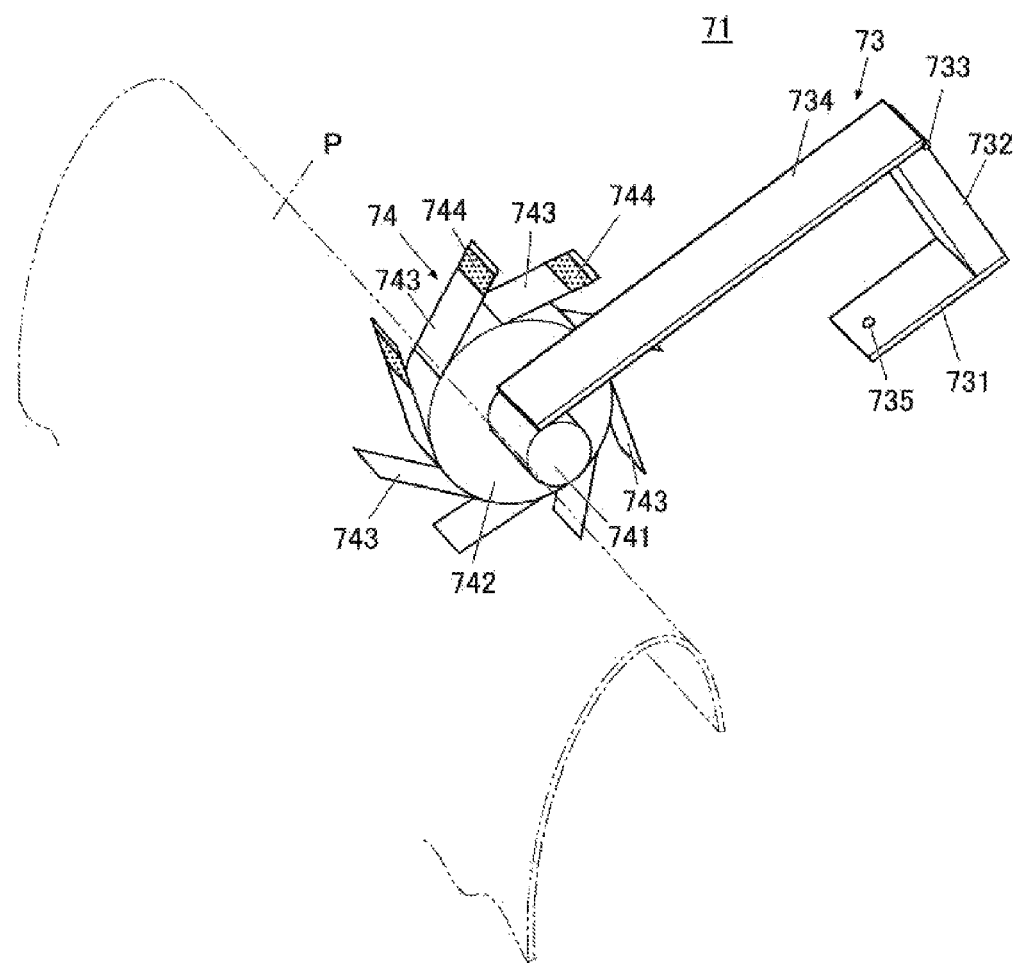
FIG. 7 is a perspective view showing a schematic structure of a catching section according to the embodiment.
Figure 8:
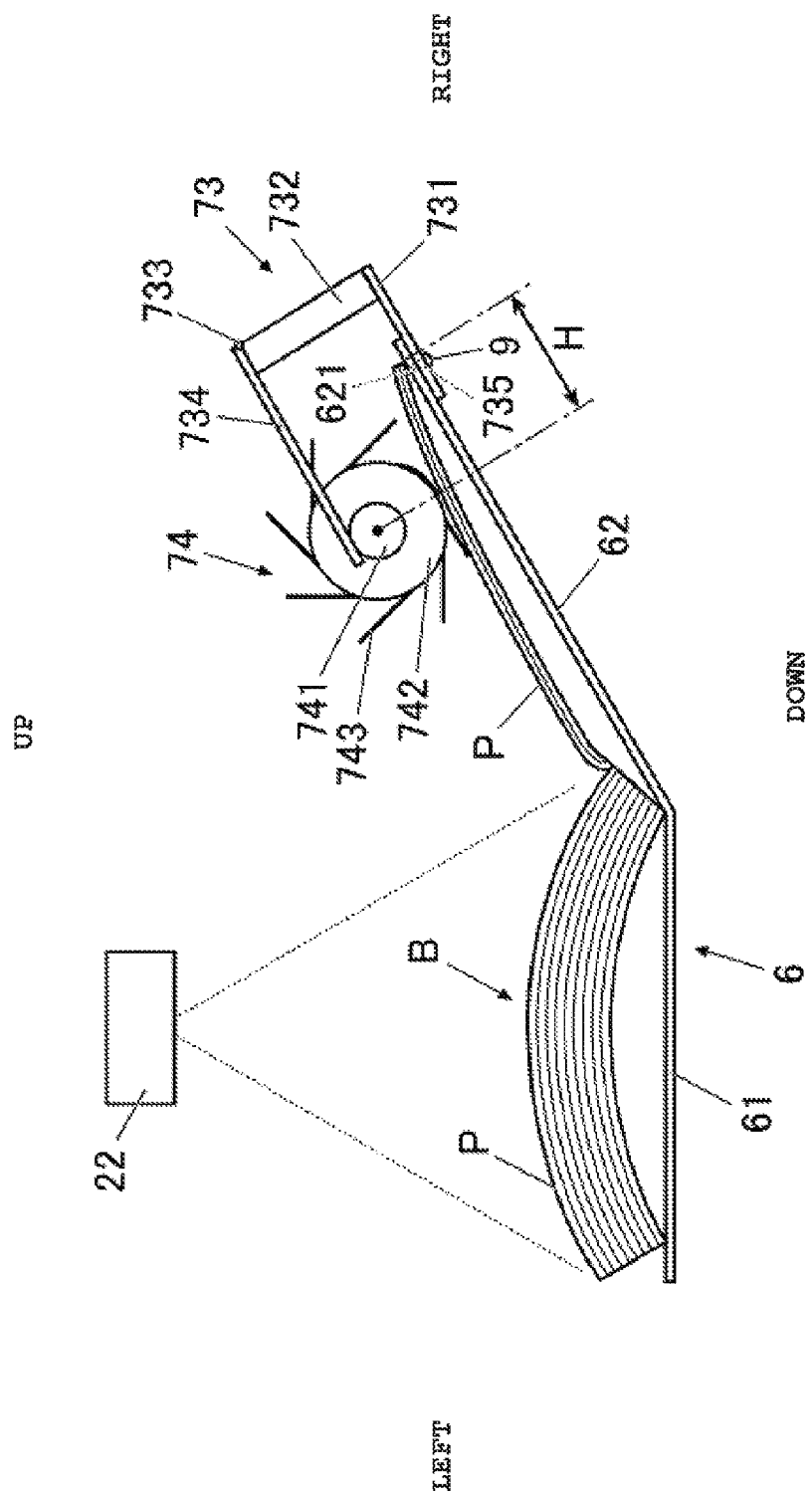
FIG. 8 is a front view showing a state of the catching section when the number of pages P at a page-turning end point is small.
Figure 9:
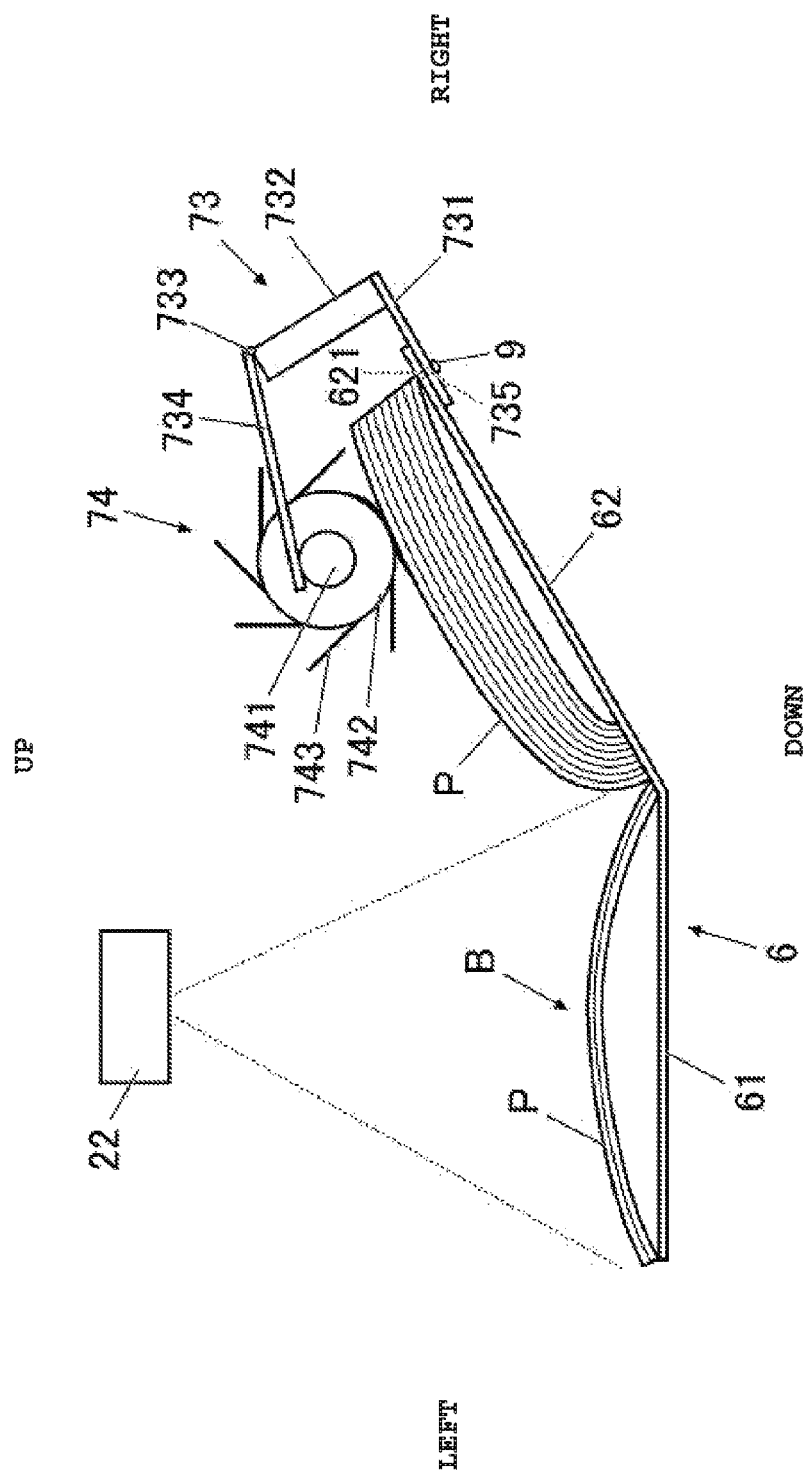
FIG. 9 is a front view showing a state of the catching section when the number of pages P at the page-turning end point is large.

FIG. 7 is a perspective view showing the schematic structure of the catching section 71, and FIG. 8 is a front view showing the state of the catching section 71 when the number of pages P at a page-turning end point is small. FIG. 9 is a front view showing the state of the catching section 71 when the number of pages P at a page-turning end point is large.

As shown in FIGS. 7 to 9, the catching section 71 includes a support section 73 fixed on the other holding plate 62 and a rotation driving section 74 supported by the support section 73.

The support section 73 includes a fixed plate 731 fixed to the lower surface of the other holding plate 62, a columnar section 732 vertically extending from the fixed plate 731, and an opening/closing section 734 (movable support arm section) openably attached to a distal end portion of the columnar section 732 by a hinge 733 such that it is opposed to the fixed plate 731. The opening/closing section 734 is openable (movable in the thickness direction) and therefore operates in proportion to the thickness of pages P at a page-turning end point, as shown in FIGS. 8 and 9. This allows the rotation driving section 74 to be arranged at an optimal position regardless of the thickness of pages P.

The fixed plate 731 is provided with a through-hole 735 for fixing, and a plurality of screw holes 621 are longitudinally and laterally formed in the lower surface of the other holding plate 62 such that they are arranged in a matrix pattern. The fixed plate 731 is fixed to the other holding plate 62 by a screw 9 being screwed into the screw hole 621 through the through-hole 735. By the screw hole 621 into which the screw 9 is screwed being adjusted, the position of the catching section 71 relative to a page P at a page-turning end point can be adjusted.

Note that a fixing method other than the method using the screw 9 can be used as long as the holding plate 62 can be fixed such that the installation position of the fixed plate 731 can be freely adjusted. For example, such methods include a method of fixing the fixed plate 731 to the holding plate 62 with a band and a method of fixing them with a magnet.

The rotation driving section 74 is provided with a motor 741 which is attached to a distal end portion of the opening/closing section 734 and a cylindrical roller section 742 which is attached to the rotating shaft of the motor 741 and rotated by the motor 741.

The roller section 742 is arranged above pages P at a page-turning end point in a direction to press the pages P. This roller section 742 is rotated by the motor 741 so as to bring a page P to a page-turning end point, and vane sections 743 for catching a page P are attached to the outer circumferential surface of the roller section 742 along the circumferential direction at predetermined intervals. Each vane section 743 is a flexible plate-like member made of resin such as PET (polyethylene terephthalate), and is attached to the roller section 742 such that it extends along a tangent to the roller section 742 in an unloaded condition. The surface of a distal end portion of each vane section 743 which comes in contact with a page P is provided with a sheet member 744 formed from an abrasion-resistant material such as urethane rubber which has a high frictional resistance to the page P.

Figure 15:
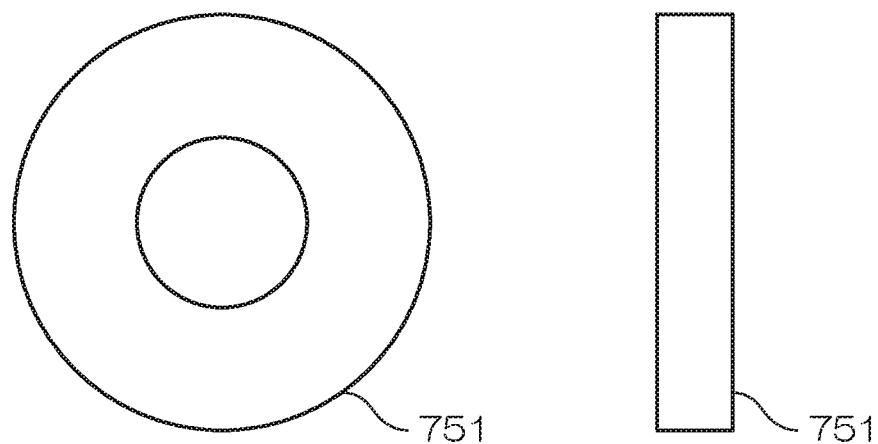
FIG. 15 is a two-view diagram showing an example of a pull-in roller.
Figure 16:
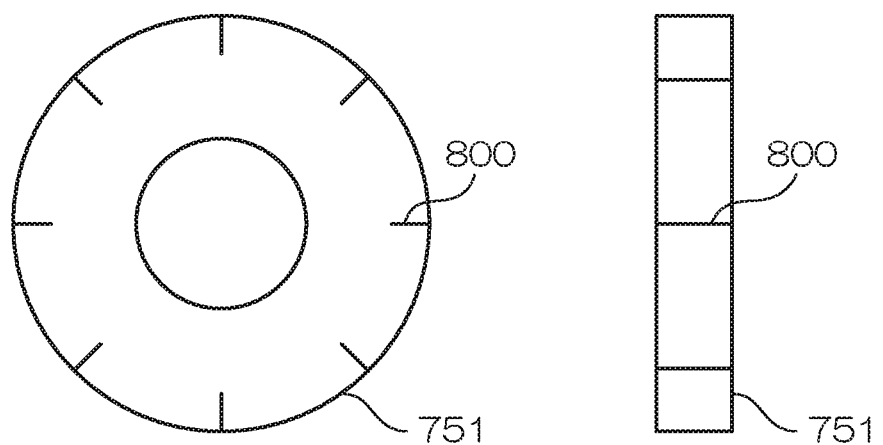
FIG. 16 is a two-view diagram showing another example of the pull-in roller.
Figure 17:
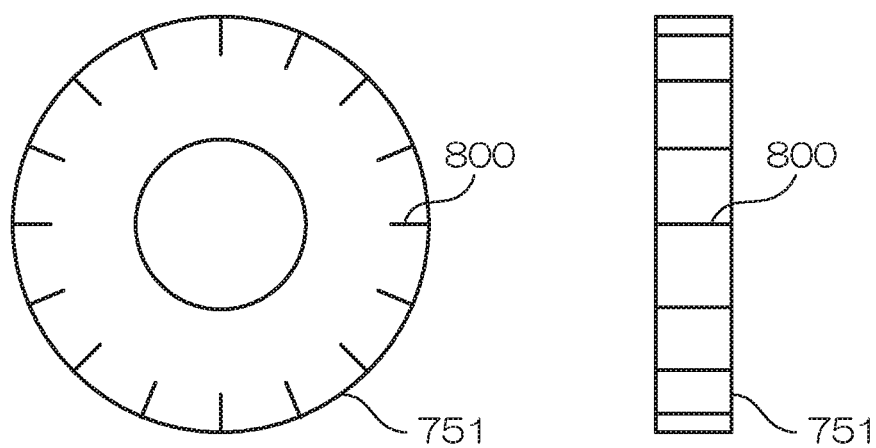
FIG. 17 is a two-view diagram showing still another example of the pull-in roller.
Figure 18:
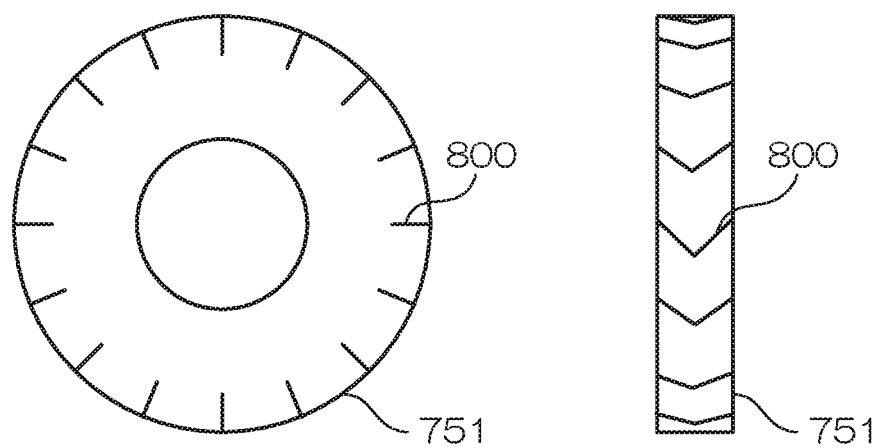
FIG. 18 is a two-view diagram showing still another example of the pull-in roller.
Figure 19:
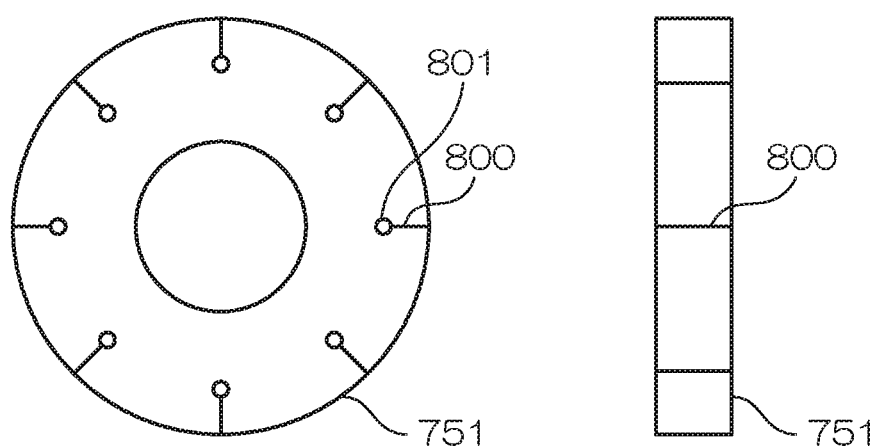
FIG. 19 is a two-view diagram showing still another example of the pull-in roller.

The roller section 742 is arranged midway along the path along which a page P at a page-turning start point is moved to a page-turning end point by a page turning operation, so that the page P is pulled into the roller section 742 by the rotation of the roller section 742. When a page P is to be caught, since the plurality of vane sections 743 are also rotating, sheet members 744 of the vane sections 743 can catch the page P and reliably feed the page P even if the path of the page P fluctuates. Note that, although the width of each vane section 743 in FIG. 7 is equal to that of the roller section 742, they are not required to have the same width, and may respectively have widths suitable for their actions. Also, the vane sections 743 are provided on the outer circumferential surface of the roller section 742 to achieve downsizing. Even if a pressing load more than necessary is unintentionally applied to the rotation driving section 74, since each vane sections 743 is formed along a tangent to the roller section 742, the root thereof does not break. Note that if its dimensional margin allows, the vane sections 743 and the roller section 742 may be provided at positions shifted in the rotation axis direction. In this case, the outer circumferential surface of the roller section 742 may come in contact with a page P. In this structure where the outer circumferential surface of the roller section 742 comes in contact with a page P, a stick-slip phenomenon may occur due to sliding between the roller section 742 and a page, which may cause abnormal noise. In order to prevent such abnormal noise, the outer circumferential surface of the roller section 742 should preferably be provided with a plurality of sipes (slits) 800. FIG. 15 shows an example without the sipes 800, and FIG. 16 shows an example having the linear sipes 800 provided at eight positions. FIG. 17 shows an example having the linear sipes 800 provided at 16 positions. Increasing the number of sipes can reduce impact noise that occurs by a difference in level due to the sipes. FIG. 18 shows an example having V-shaped sipes 800 provided at 16 positions. Obliquely slitting sipes can also reduce impact noise that occurs by differences in level due to the sipes. In addition, forming each sipe into a V shape cancels a thrust force that is generated in a direction perpendicular to the page catching direction and acts on a page P. FIG. 19 shows an example having linear sipes 800 provided at eight positions and through-holes 801 provided in the bottoms of the sipes. Each through-hole 801 forms the bottom of a corresponding sipe into an R shape, which reduces stress concentration and prevents the development of rupture of the sipe.

Even after a page P at a page-turning end point is separated from the sticking section 35, the rotation of the roller section 742 acts on the page P so as to prevent it from returning to a page-turning start point.

Figure 10:
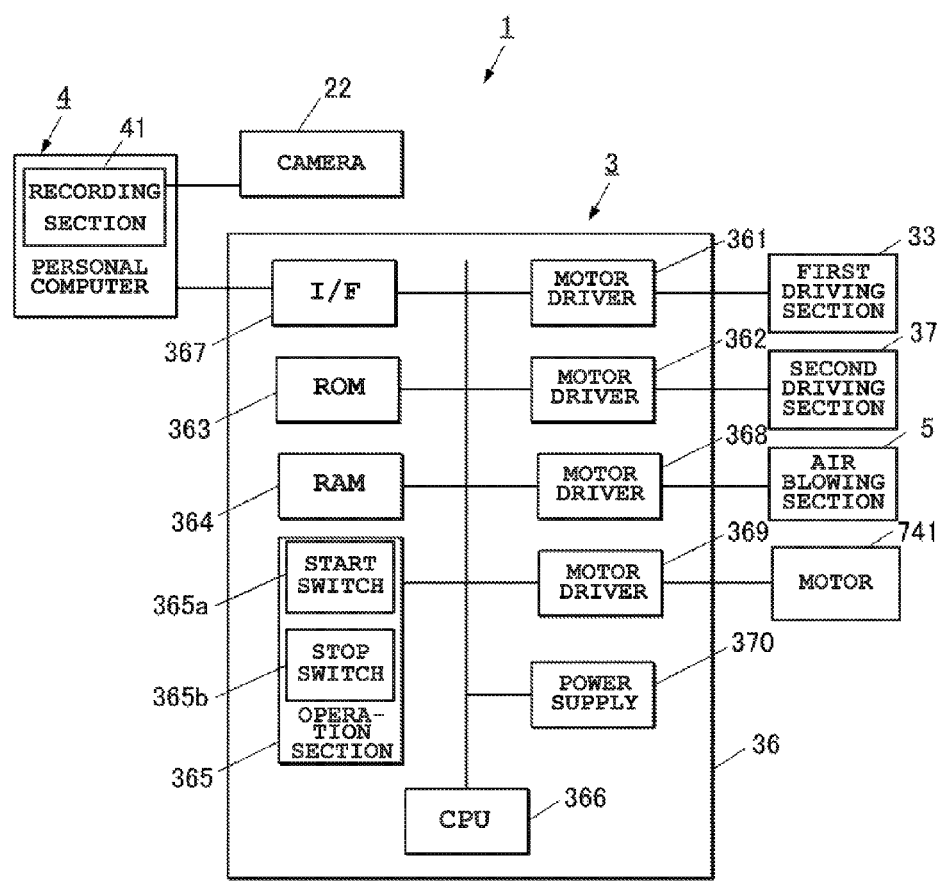
FIG. 10 is a block diagram showing the main control configuration of the document camera system according to the embodiment.

Next, the main control configuration of the document camera system 1 according to the first embodiment is described. FIG. 10 is a block diagram showing the main control configuration of the document camera system 1. As shown in FIG. 10, the control section 36 of the page turning apparatus 3 includes a motor driver 361 for driving the first driving section 33, a motor driver 362 for driving the second driving section 37, a motor driver 368 for driving the air blowing section 5, a motor driver 369 for driving the motor 741, a ROM (Read Only Memory) 363 in which various programs are stored, a RAM (Random Access Memory) 364 in which a program is loaded from the ROM 363 at the time of execution of the program, an operation section 365 with which various types of commands are inputted, a CPU (Central Processing Unit) 366 which controls the motor drivers 361 and 362 by loading programs from the ROM 363 into the RAM 364 and executing the programs based on instructions from the operation section 365, an I/F 367 to which the personal computer 4 is connected, and a power supply 370.

The operation section 365 is provided with a start switch 365a for starting page turning processing and a stop switch 365b for stopping page turning processing.

Figure 11:
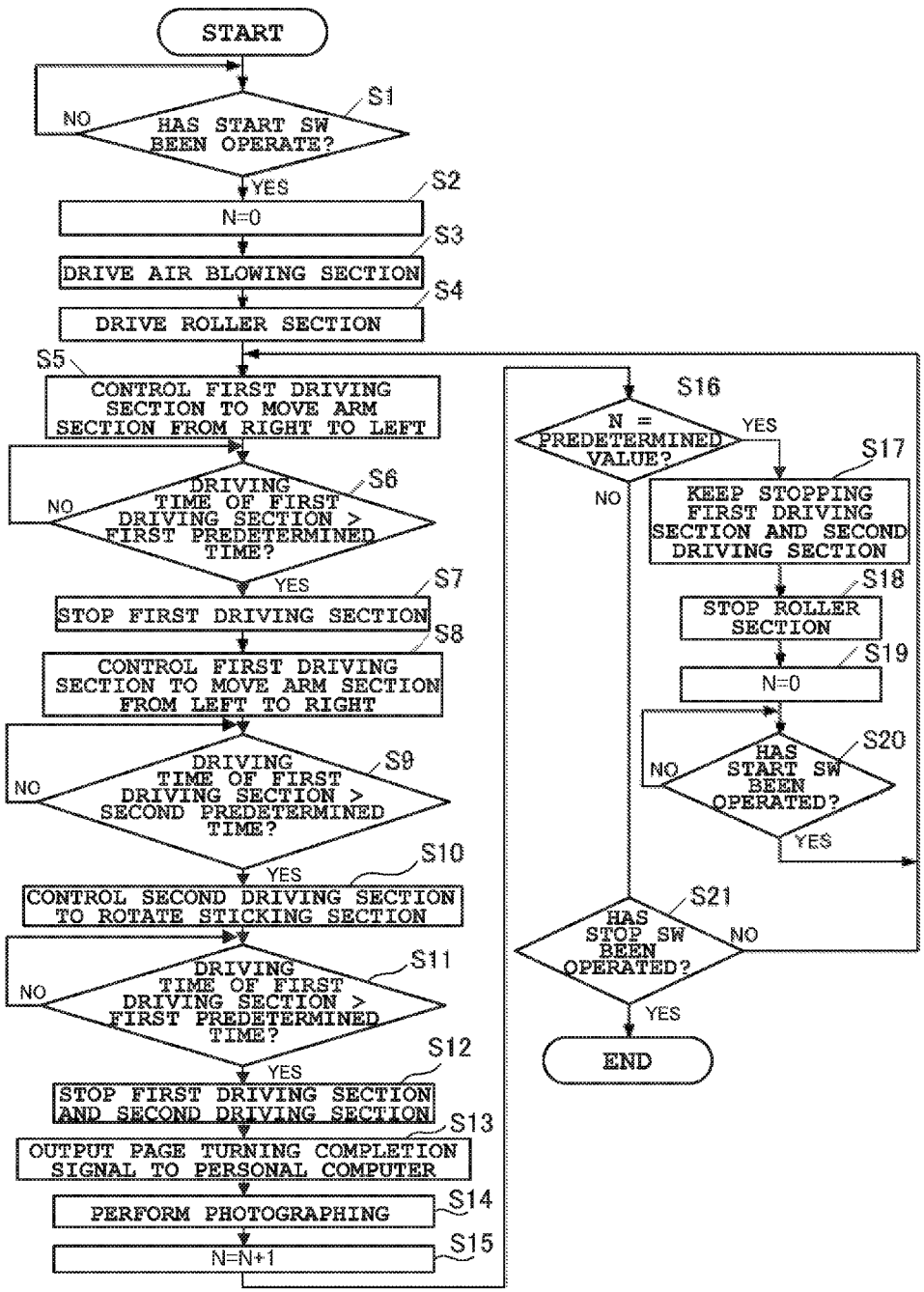
FIG. 11 is a flowchart showing a procedure for page turning processing that is executed by the page turning apparatus according to the embodiment.

Next, page turning processing to be performed by the document camera system 1 is described. FIG. 11 is a flowchart showing the processing procedure thereof.

First, preparation before the execution of page turning processing is described.

The user first opens the lid section 42 from the page turning apparatus body 30, so that transition from an accommodated state to an opened state is made. In addition, the user causes the pedestal section 38 to be rotationally moved around the rotary shaft 384 so as to pull the pedestal section 38 out of the accommodation case 31, whereby switching to an operation state in which the arm section 34 is operated (see FIG. 1) is made. Then, the user places the holding table 6 on the lid section 42 in the open state, and places the book B on the holding table 6.

Upon placing the book B, the user sets the page holding section 7. More specifically, the user fixes the other holding plate 62 and the front cover of the book B with the clip section 72. In addition, the user fixes the support section 73 of the catching section 71 on the other holding plate 62 while adjusting the position of the support section 73. Here, as shown in FIG. 8, the position of the support section 73 should preferably be adjusted such that an interval H between a side end portion of an uppermost page P at a page-turning end point (the front cover of the book B fixed to the other holding plate 62 in the initial state) and the rotation center of the roller section 742 comes within a range of 5 mm to 10 mm.

Next, the user adjusts the blowing direction of air from the air blowing section 5 such that air passes above pages P at a page-turning start point and reaches the page P at the page-turning end point. An arrow Y2 in FIG. 1 indicates the blowing direction of air. More specifically, air from the air blowing section 5 should preferably be flown toward a position near the contact position between the roller section 742 and the page P at the page-turning end point. In this case, the vent of the air blowing section 5 may be provided with a streamer formed from a ribbon string so as to allow the user to see the blowing direction of air.

In addition, the user adjusts the position of the arm section 34 such that the sticking section 35 is arranged at a starting point (the ending point position of the backward movement) in advance. More specifically, the user also adjusts the position of the holding table 6 such that the sticking section 35 comes in contact with an upper left portion of a page P at the page-turning start point (see FIG. 1).

Then, the user opens the book B to the previous page P of a page P from which the user wants to start an image capturing operation, and moves the sticking section 35 to the ending point position of the forward movement (the starting point position of the backward movement) in advance.

Also, the user adjusts the position of the camera 22 such that the page P at the page-turning start point comes within the viewing angle of the camera 22.

When the user turns on the power supply 370 of the page turning apparatus 3 upon the completion of the preparation, the CPU 366 loads a program for page turning processing from the ROM 363 into the RAM 364 and executes the program.

As shown in FIG. 11, at Step S1, the CPU 366 judges whether the user has operated the start switch 365*a*. When judged that the user has not operated the start switch 365*a*, the CPU 366 maintains the current state. When judged that the user has operated the start switch 365*a*, the CPU 366 proceeds to Step S2.

At Step S2, the CPU 366 resets the N value stored in the RAM 364 to 0.

At Step S3, the CPU 366 drives the air blowing section 5 to blow air.

At Step S4, the CPU 366 drives the motor 741 to rotate the roller section 742.

At Step S5, the CPU 366 controls the first driving section 33 to move the arm section 34 from right to left (backward movement).

At Step S6, the CPU 366 judges whether the driving time of the first driving section 33 has exceeded a first predetermined time. When judged that the driving time is equal to or less than the first predetermined time, the CPU 366 continues to drive the first driving section 33. When judged that the driving time has exceeded the first predetermined time, the CPU 366 proceeds to Step S6. Note that the first predetermined time has been set to a time that allows the arm section 34 to move from the starting point of a backward movement to the ending point.

At Step S7, the CPU 366 stops the first driving section 33, which causes the sticking section 35 to stick to the page P on the left side with the rotation being stopped (see FIG. 1).

At Step S8, the CPU 366 controls the first driving section 33 to move the arm section 34 from left to right (forward movement). By this operation, the page P at the page-turning start point starts to move to the page-turning end point while sticking to the sticking section 35.

At Step S9, the CPU 366 judges whether the driving time of the first driving section 33 has exceeded a second predetermined time. When judged that the driving time is equal to or less than the second predetermined time, the CPU 366 continues to drive the first driving section 33 without any change. When judged that the driving time has exceeded the second predetermined time, the CPU 366 proceeds to Step S9. Note that the second predetermined time has been set to a time shorter than the first predetermined time, which should preferably be set to a period of time from when the arm section 34 passes through a substantially middle point of the passage of a forward movement after starting the forward movement until when the arm section 34 ends the forward movement.

At Step S10, the CPU 366 controls the second driving section 37 to rotate the sticking section 35 while driving the first driving section 33. This rotation changes the sticking strength of the sticking section 35 when the page P is separated from the sticking section 35, whereby the sticking section 35 can be reliably separated from the page P. In addition, in the forward movement, the arm section 34 rotates clockwise. In order to improve the separation performance, the second driving section 37 should preferably rotate the sticking section 35 in a direction opposite to that of the swing of the arm section 34, or in other words, the second driving section 37 should preferably rotate in the counterclockwise direction.

At Step S11, the CPU 366 judges whether the driving time of the first driving section 33 has exceeded the first predetermined time. When judged that the driving time is equal to or less than the first predetermined time, the CPU 366 continues to drive the first driving section 33 and the second driving section 37 without any change. When judged that the driving time has exceeded the first predetermined time, the CPU 366 proceeds to Step S11.

Then, the page P is separated from the sticking section 35 within a period during which the second driving section 37 is rotated.

In this case, by coming in contact with the page P separated from the sticking section 35, air from the air blowing section 5 guides the page P to the page-turning end point and prevents it from returning to the page-turning start point. In addition, the sticking section 35 is arranged at a position away from the page P at the page-turning end point with it being separated from the page P. At this position, the sticking section 35 and the arm section 34 are not within the viewing angle of the camera 22.

In Step S8 to Step S11, the page P is turned from the page-turning start point to the page-turning end point. Here, since the roller section 742 rotates at a midway position in this page turning operation, the page P is caught by the plurality of vane sections 743 and guided to the outer circumferential surface of the roller section 742. This page P which has reached the roller section 742 is caught by the roller section 742 and sent to the page-turning end point. Then, since the roller section 742 keeps rotating also in a subsequent page turning operation, the page P at the page-turning end point remains at the position.

At Step S12, the CPU 366 stops the first driving section 33 and the second driving section 37. Here, although the arm section 34 continues to keep rotating clockwise due to its inertial force, the stopper 383 restricts its further rotation.

At Step S13, the CPU 366 outputs a page turning completion signal to the personal computer 4.

At Step S14, based on the input page turning completion signal, the personal computer 4 controls the camera 22 to photograph the page P of the currently open pages P which is located at the page-turning end point. Here, the sticking section 35, the arm section 34, the air blowing section 5, and the page holding section 7 are not within the viewing angle of the camera 22, and therefore only the page P at the page-turning end point is photographed. Image data acquired by the camera 22 are numbered and recorded in a recording section 41 of the personal computer 4 for each page (each imaging operation). In this case where only pages P at the page-turning start point, such as odd-numbered pages P, are photographed, images photographed thereby and images separately acquired by only even-numbered pages being set at a page-turning start point and photographed are alternately rearranged in page order so as to be compiled as scan images of all the pages.

At Step S15, the CPU 366 adds 1 to the N value and stores the resultant value in the RAM 364. As such, the CPU 366 and the RAM 364 function as a measuring section for measuring the number of times of page turning operations according to the present invention.

In Step S16, the CPU 366 judges whether the N value is equal to a predetermined value. When the N value is not equal to the predetermined value, the CPU 366 proceeds to Step S21. When the N value is equal to the predetermined value, the CPU 366 proceeds to Step S17.

The predetermined value is an upper limit value below which the roller section 742 can stably catch a page P. The optimal value of the predetermined value varies depending on the paper type of the pages P and the size of the book B. The first embodiment uses, for example, 50 as the predetermined value.

At Step S17, the CPU 366 keeps stopping the first driving section 33 and the second driving section 37.

At Step S18, the CPU 366 stops the motor 741 to stop the roller section 742.

At Step S19, the CPU 366 resets the N value stored in the RAM 364 to 0.

When the roller section 742 stops, the user sets the page holding section 7 again. More specifically, the user fixes a plurality of pages P at the page-turning end point to the other holding plate 62 by using the clip section 72. In addition, the user adjusts the position of the support section 73 such that the interval H between a side end portion of the uppermost page P at the page-turning end point and the rotation center of the roller section 742 comes within a range of 5 mm to 10 mm. When the setting is completed, the user operates the start switch 365a.

At Step S20, the CPU 366 judges whether the user has operated the start switch 365a. When judged that the start switch 365a has not been operated, the CPU 366 maintains the current state. When judged that the start switch 365a has been operated, the CPU 366 proceeds to Step S5.

At Step S21, the CPU 366 judges whether the user has operated the stop switch 365b. When judged that the stop switch 365b has not been operated, the CPU 366 proceeds to Step S5. When judged that the stop switch 365b has been operated, the CPU 366 ends the page turning processing. As a result, the page turning operation and the imaging operation are repeated, whereby the photographing of desired pages P is achieved.

As described above, in the first embodiment, the roller section 742 is rotated, whereby a page P being turned by a page turning operation is caught by the roller section 742 and sent to a page-turning end point. This prevents the page P being turned by a page turning operation from returning to the page-turning start point. In addition, even after the page P is separated from the sticking section 35 at the page-turning end point, the rotation of the roller section 742 acts on the page P, which also prevents the page P from returning to the page-turning start point. As a result of this structure, the reliability of page turning can be improved.

Also, the vane sections 743 for catching a page P are attached to the outer circumferential surface of the roller section 742, whereby the page P is caught by the plurality of vane sections 743 and guided to the outer circumferential surface of the roller section 742. This allows the rotation of the roller section 742 to reliably act on the page P.

Moreover, by having flexibility, the vane sections 743 bend in accordance with the shape of a page P, whereby the page P is more reliably captured. Furthermore, since distal end portions of the vane sections 743 are provided with the sheet members 744 formed from a material having a higher friction resistance than those of the pages P, a page P is not easily separated after being caught by the sheet members 744, so that its caught state can be maintained.

Still further, when the number of turned pages P reaches a predetermined value, the first driving section 33, the second driving section 37, and the motor 741 are stopped to stop the page turning operation and the rotation of the roller section 742. While these sections are being stopped, the user can set the page holding section 7 again, so that the page holding section 7 can be set at an optimal position even for these pages P increased at a page-turning end point.

Yet still further, the position of the roller section 742 relative to pages P at a page-turning end point can be freely adjusted. As a result, the roller section 742 can be set at an optimal position in accordance with the type of a book B and its thickness. In addition, the position of the roller section 742 in the process of page turning can also be adjusted.

Yet still further, since the position of the roller section 742 in the thickness direction varies depending on the thickness of pages P at a page-turning end point. As a result, the roller section 742 can be arranged in accordance with the thickness of pages P at a page-turning end point.

Yet still further, since the air blowing section 5 blows air against a page P in the middle of being turned at a midway position, it is possible to smoothly feed the page P to a page-turning end point while suppressing the effect of air on pages P at a page-turning start point.

Yet still further, since the air blowing section 5 is provided such that the blowing direction of air can be freely adjusted, the blowing direction of air can be adjusted such that air is blown to an optimal point in accordance with the size and thickness of the book B. The optimal point herein is, for example, a point near a contact point between the roller section 742 and a page P at a page-turning end point. Blowing air to this point can suppress the bending of a page P moving to a page-turning end point.

Yet still further, when a page P is to be photographed by the camera 22, the turning mechanism (the first driving section 33, the arm section 34, and the sticking section 35) and the roller section 742 are located outside the viewing angle of the camera 22 of the roller section 742, which prevents the turning mechanism and the roller section 742 from being shown in a captured image, so that a preferable image can be captured.

B. Second Embodiment

Figure 12:
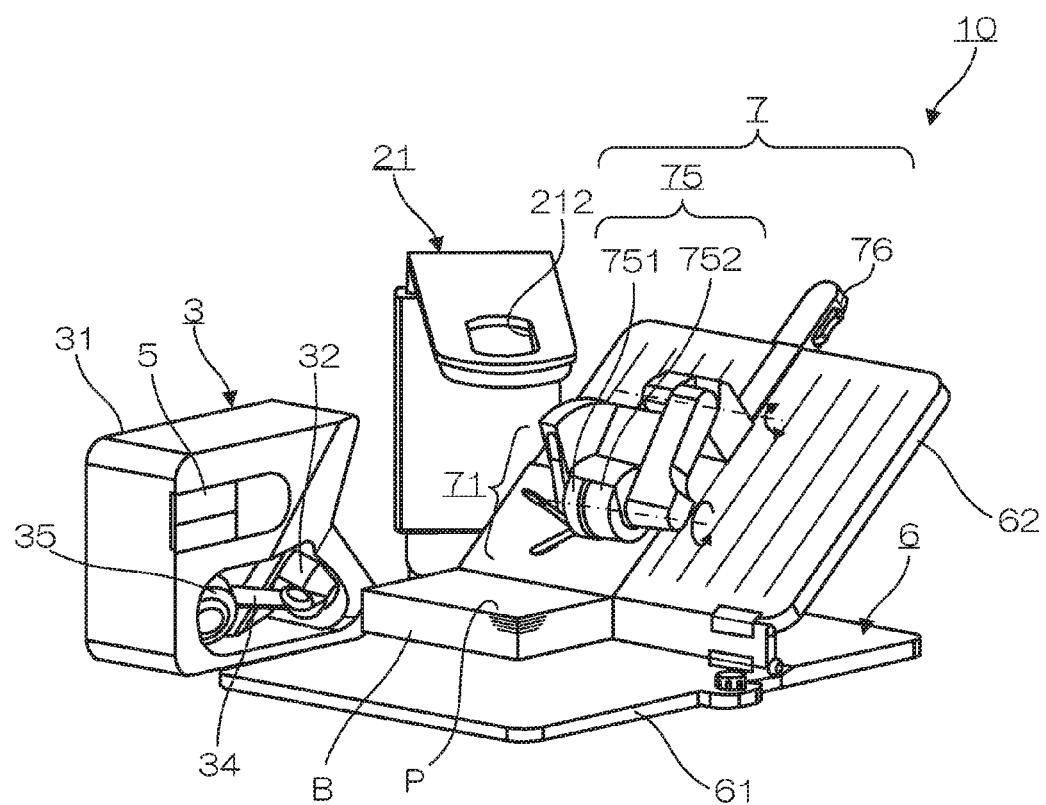
FIG. 12 is a perspective view showing a schematic structure of a document camera system 10 according to a second embodiment of the present invention.

FIG. 12 is a perspective view showing the schematic structure of a document camera system 10 according to a second embodiment of the present invention. Note that sections corresponding to those in FIG. 1 are provided with the same reference numerals, and descriptions thereof are omitted. As shown in FIG. 12, the document camera system 10 includes a stand section 21 on which an information processing terminal (a smartphone, tablet, or the like) having an imaging means for photographing pages P of a book B, a page turning apparatus 3 which turns the pages P of the book B, a holding table 6 on which the book B is set, and a page holding section 7 which holds pages P at a page-turning end point.

The stand section 21 is tiltable in the front-and-back direction and the right-and-left direction and is vertically extendable so that the relative positional relationship between the book B and an information processing terminal (not shown) can be adjusted. This stand section 21 is provided with an opening section 212, and the information processing terminal (not shown) is placed thereon such that the lens of the imaging means (not shown) is oriented downward through the opening section 212 (such that pages P of the book B are within the viewing angle).

The page holding section 7 includes a page pressing apparatus 75 which presses and holds pages P at a page-turning end point and a positioning section 76 which adjusts the fixing position of the page holding section 7, in addition to a catching section 71 which brings a page P to the page-turning end point so as to prevent it from returning to the page-turning start point. The page pressing apparatus 75 includes a pull-in roller 751 which rotates coaxially with the catching section 71 and pulls in a page P conveyed by the sticking section 35 and caught by the catching section 71 so as to prevent the page P from returning to a page-turning start point, and a pressing roller 752 which presses and holds the page P at the page-turning end point. The positioning section 76 adjusts the fixed position of the page holding section 7 in accordance with the size of the book B and fixes it to a holding plate 62.

The operations of an arm section 34, a sticking section 35, and the catching section 71 are the same as those of the first embodiment. In the second embodiment, in addition to the operation of the catching section 71, a page P conveyed by the sticking section 35 and caught by the catching section 71 is further pulled in by the pull-in roller 751, and thereby reliably pressed and held at a page-turning end point by the pressing roller 752.

Figure 13:
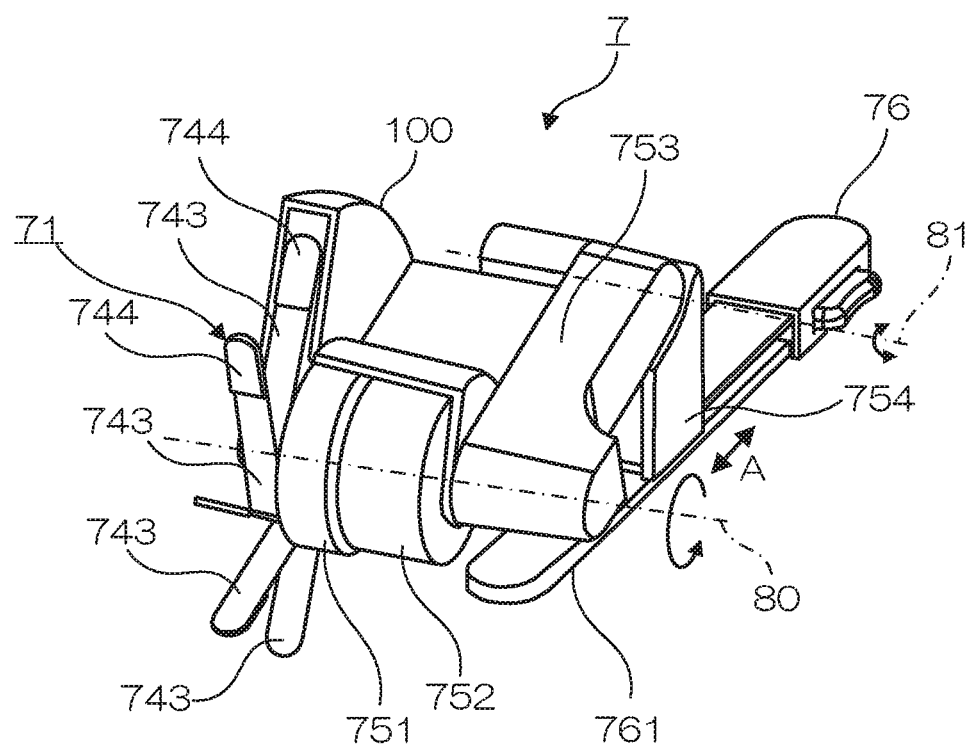
FIG. 13 is a perspective view showing the external structure of a page holding section 7 according to the second embodiment.

FIG. 13 is a perspective view showing the external structure of the page holding section 7 according to the second embodiment. The catching section 71, the pull-in roller 751, and the pressing roller 752 are coaxially arranged and covered by a roller cover 100. During a page turning operation, a driving force is applied to the catching section 71, the pull-in roller 751, and the pressing roller 752 to rotate around a rotation axis 80 driven by a motor (not shown).

As in the case of the first embodiment, when a page P is conveyed by the sticking section 35, the catching section 71 brings the page P to a page-turning end point while rubbing the page surface with sheet members 744 provided on distal end portions of rotating vane sections 743. The pull-in roller 751 is formed from a flexible sponge-like material having, in its free form, a diameter smaller than that of the catching section 71 and larger than that of the pressing roller 752. This pull-in roller 751 pulls in a page P caught by the vane sections 743 of the catching section 71. Since the diameter of the pull-in roller 751 is smaller than that of the catching section 71, it can easily pull in a page P caught by the catching section 71. In addition, the pull-in roller 751 is deformed at a position where it presses a page P, whereby its diameter becomes equal to that of the pressing roller 752, and a pressing force more than necessary is not applied to the page P.

The pressing roller 752 has a diameter further smaller than that of the pull-in roller 751, and has a surface formed from a material (urethane rubber or the like) with a large friction coefficient with respect to a page P. Since the pressing roller 752 has a smaller diameter than the pull-in roller 751, a page P caught by the pull-in roller 751 can be easily pressed and held at a page-turning end point.

As described above, in the second embodiment, the vane sections 743 of the catching section 71, the pressing roller 752, and the image processing apparatus 53 are arranged in descending order of diameter, whereby a page P can be smoothly pulled in and pressed to be held.

An arm section 753 in FIG. 13 includes therein a motor (not shown) which rotates the catching section 71, the pull-in roller 751, and the pressing roller 752, and electrical power is supplied from the page turning apparatus 3 side to the motor via a predetermined cable (e.g., a USB cable). The motor is driven/controlled in conjunction with a page turning operation. The arm section 753 rotates around a rotation axis 81 in accordance with the thickness of pages P at a page-turning end point to allow the catching section 71, the pull-in roller 751, and the pressing roller 752 to be arranged at optimal positions regardless of the thickness of the pages P. This arm section 753 is structured to force the catching section 71, the pull-in roller 751, and the pressing roller 752 toward a page P with predetermined pressing forces generated by forcing means such as springs (not shown) and their own weights.

Note that the pressing forces generated by the forcing means such as springs can be adjusted in accordance with the size of the book B, its paper type, and its opening angle.

The arm section 753 is fixed to a body frame section 754 in a manner to be rotationally movable. The body frame section 754 is further fixed to a slide rail 761 of the positioning section 76 in a manner to be movable in the direction indicated by arrow A. A plurality of rail grooves extending in a direction perpendicular to arrow A are formed in the slide rail 761 at predetermined intervals, and a fixing member incorporated in the body frame section 754 is fitted into one of these rail grooves to be fixed at the position of the rail groove. As such, the fixed position of the page holding section 7 can be freely changed in accordance with the size of the book B.

Figure 14:
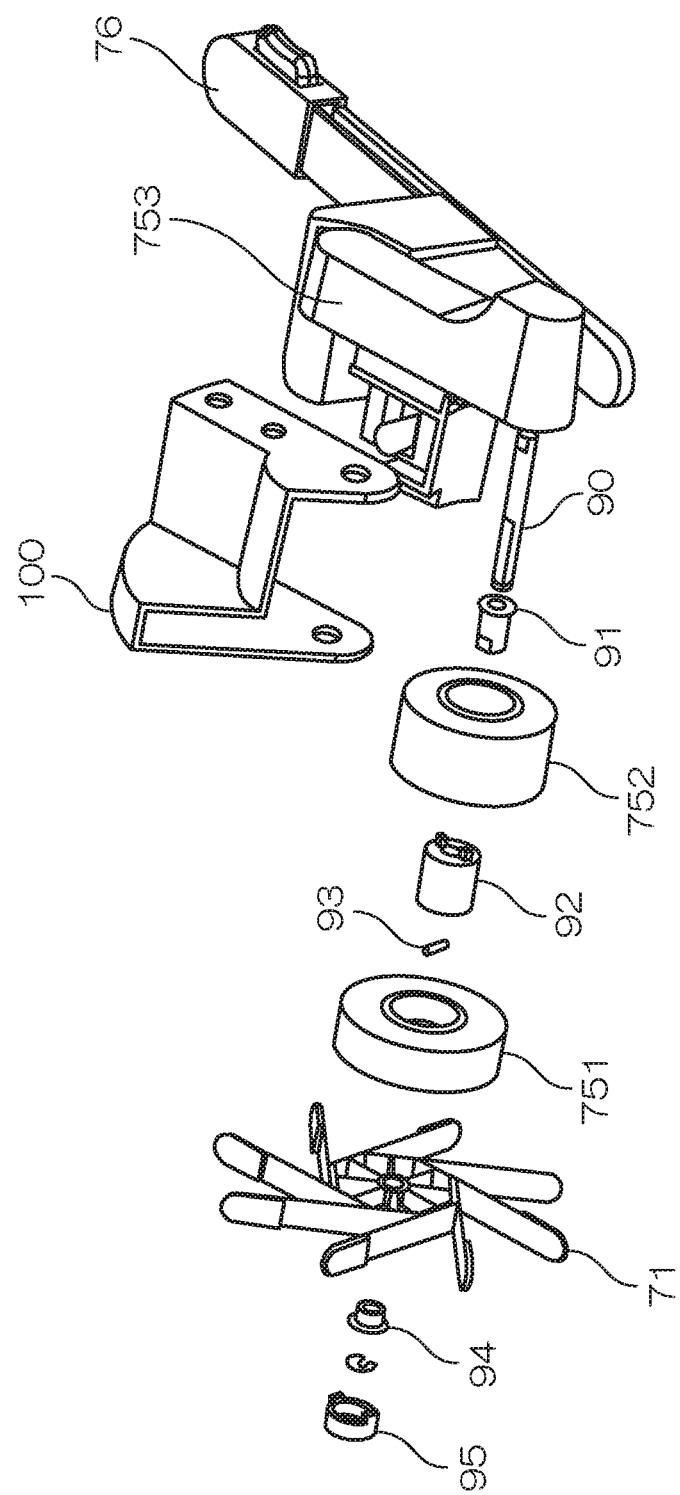
FIG. 14 is an exploded view showing the internal structure of the page holding section 7 according to the second embodiment.

FIG. 14 is an exploded view showing the internal structure of the page holding section 7 according to the second embodiment.

The catching section 71, the pull-in roller 751, and the pressing roller 752 are connected to a roller shaft 90 of a motor (not shown), and an end portion of the roller shaft 90 is fitted into a bearing 94 and covered with a cap 95. The pressing roller 752 has therein a torque limiter (torque limiting function member) 92, and the roller shaft 90 rotates the pressing roller 752 through the torque limiter 92. The torque limiter 92 blocks a rotation force from the roller shaft 90 when a predetermined load or more is exerted on the torque limiter 92. For example, this limiter is of a mechanical type using friction, resistance, a spring, and the like or of a magnet type using magnetic force. The present embodiment uses a magnet type torque limiter.

The torque limiter 92 is mounted between the pressing roller 752 and the roller shaft 90 which receives a driving force from the motor. An inner member of the torque limiter 92 is fixed to the roller shaft 90 with a pin 93, and an outer member of the torque limiter 92 is fixed to the pressing roller 752. The pressing roller 752 is driven in conjunction with the rotation of the outer member of the torque limiter 92. As a result of this structure, when a predetermined load or more is exerted on the torque limiter 92, the outer member stops rotating although the inner member rotates in conjunction with the rotation of the roller shaft 90 (the roller shaft 90 continues its rotation to keep rotating the catching section 71 and the pull-in roller 751). When the outer member of the torque limiter 92 stops rotating, the pressing roller 752 also stops rotating.

Note that a specific load that stops the rotation of the torque limiter 92 can be arbitrarily set. A driving force that is transmitted to the pressing roller 752 through the torque limiter 92, that is, a tensile force that is generated in a page P pressed by the pressing roller 752 is set to a magnitude that does not damage the page P and does not make the pressing roller 752 slip on the surface of the page P. That is, when the above-described force exceeds the magnitude that does not damage the page P and does not make the pressing roller 752 slip on the surface of the page P, the torque limiter 92 stops the rotation of the pressing roller 752.

If the pressing roller 752 keeps rotating while pressing a page P to reliably hold the page P at a page-turning end point, it may leave a scrubbing mark on the page P or tear the page P. For this reason, the pressing roller 752 is mounted in the torque limiter 92 as described above, and the torque limiter 92 blocks a rotation force from the roller shaft 90 so as to stop the rotation of the pressing roller 752 when the pressing roller 752 presses the page P and a predetermined load or more is exerted on the torque limiter 92 due to friction between the pressing roller 752 and the page P. By the rotation of the pressing roller 752 being stopped, the pressing roller 752 is prevented from leaving a scrubbing mark on the surface of the page P or tearing the page P while reliably pressing and holding the page P.

When the next page P is conveyed by the sticking section 35 with the rotation of the pressing roller 752 being stopped, the next page P is caught by the catching section 71 and pulled to the page-turning end point by the pull-in roller 751. When the next page P is pulled in by the pull-in roller 751, the next page P is fed and slid into an area below the pressing roller 752 whose rotation has been stopped (area between the pressing roller 752 and the previous page P held at the page-turning end point).

When the next page P (its end portion) is fed to the area below the pressing roller 752, a load exerted on the pressing roller 752 decreases, and the driving force of the roller shaft 90 is transmitted to the pressing roller 752 through the torque limiter 92, whereby the pressing roller 752 restarts rotating. As a result, the pressing roller 752 presses and holds the next page P pulled in by the pull-in roller 751, at the page-turning end point. Then, by the next page P being pressed, a predetermined load or more is exerted on the pressing roller 752, so that the torque limiter 92 cuts off the driving force of the roller shaft 90, and the rotation of the pressing roller 752 is stopped. During the page turning operation, these operations are repeatedly performed.

As described above, the second embodiment is provided with the rollers (the pull-in roller 751 and the pressing roller 752) which rotate coaxially with the rotation axis of the catching section 71 and press a page P fed to a page-turning end point by the catching section 71, at the page-turning end point, in addition to the catching section 71 having on its outer circumferential surface the plurality of vane sections 743 for catching the page P. As a result of this structure, the durability of the plurality of vane sections 743, page pressing capability and page maintainability (prevention of rubbing marks and page tears) can be improved.

Also, in the second embodiment, the rollers (the pull-in roller 751 and the pressing roller 752) are formed from a material which is elastically deformed when a predetermined pressing load is applied, and press a page P fed by the catching section 71 at a page-turning end point with a wide nip. As a result of this structure, the pressing load required for the vane sections 743 can be reduced, and the durability of the plurality of vane sections 743, the page pressing ability, and the page maintainability can be further improved.

Moreover, the second embodiment includes, as the rollers which rotate coaxially with the rotation axis of the catching section 71, the pull-in roller 751 formed from a material (sponge or the like) which is elastically deformed when a predetermined pressing load is applied, and the pressing roller 752 formed from a material (e.g., urethane) which has a diameter smaller than that of the pull-in roller 751 and whose elastic deformability is lower than that of the pull-in roller 751. The pull-in roller 751 pulls a page P fed by the catching section 71 to a page-turning end point, and then the pressing roller 752 presses and holds the page P pulled in by the pull-in roller 751 at a page-turning end point. When the pull-in roller 751 formed from the elastically deformable material is used to press a page P, a heavy load is exerted on the pull-in roller 751. However, in the present embodiment, since the pressing roller 752 presses a page P, the pull-in roller 751 is only required to have a function for pulling a page P to the pressing roller 752, which improves the durability of the pull-in roller 751.

Furthermore, in the second embodiment, the surface of the pressing roller 752 is formed from a material (e.g., urethane) having a large friction coefficient with respect to a page P, and the torque limiter 92, which blocks a rotation force from the roller shaft 90 when a predetermined load or more is exerted on the pressing roller 752, is provided between the pressing roller 752 and the roller shaft 90. When a pulled page P is to be pressed, the torque limiter 92 stops the rotation of the pressing roller 752. As a result of this structure, a page P can be reliably pressed without any scrubbing mark on the surface of the page P or tearing of the page P.

Note that the present invention is not limited to the first and second embodiments can be modified as needed.

For example, in the first and second embodiments, the cases have been exemplarily described in which the sticking section 35 includes the adhesive member and sticks to a page P with the adhesiveness of the adhesive member. However, a structure may be adopted in which the sticking section sticks to a page P with suction or the like. In this structure, a connecting hole that connects to the internal space is formed in the circumferential surface of the sticking section so that the internal space of the sticking section is connected to a pump and, when the pump is driven to produce a negative pressure in the internal space, a suction force acts in the connecting hole. By using this suction force, the sticking section sticks to a page P.

Also, in addition to suction and adhesiveness, a sticking function using electrostatic attraction can be adopted for the sticking section.

Also, in the first and second embodiments, the cases have been exemplarily described in which the page turning apparatus 3 and the document camera 2 are separate apparatuses. However, the document camera can be accommodated in the accommodation case.

Moreover, in the first and second embodiments, the cases have been exemplarily described in which the outer circumferential surface of the roller section 742 is provided with the plurality of vane sections 743. However, a roller section having no vane sections can be used. In this structure, anti-slipping processing should preferably be applied to the surface of the roller section in advance so that a page P is easily caught.

Furthermore, in the second embodiment, the pressing roller 752 has been adopted which does not rotate on a page. However, if each page has a certain strength and certain printing durability, the pressing roller 752 may be omitted.

Still further, in the above descriptions, the preferred embodiments have been described in which the plurality of vane sections 743 are provided. However, the present invention does not exclude a structure with one vane section.

In addition, the vane sections 743 are flexible plate-like members. However, an elastic metal wire formed into a loop shape to have the same function as the vane may be adopted. In this case, the area of the vane section is decreased, and therefore the effect of reducing noise produced by the vane sections is achieved.

While the present invention has been described with reference to the preferred embodiments, it is intended that the invention be not limited by any of the details of the description therein but includes all the embodiments which fall within the scope of the appended claims.

What is claimed is:

1. A page pressing apparatus comprising:
   a first roller which rotates around a rotation axis, and presses a page fed to a page-turning end point, with a predetermined pressing load; and
   a catching section which is arranged at a position in an axis direction of the rotation axis with respect to the first roller and catches the page so as to feed the page to the page-turning end point by causing a plurality of vane sections arranged around the rotation axis to rotate around the rotation axis.

2. The page pressing apparatus according to claim 1, wherein the catching section is adjacent to the first roller at a predetermined interval.

3. The page pressing apparatus according to claim 2, wherein the first roller is constituted by a sponge-like material which is elastically deformed by the predetermined pressing load.

4. The page pressing apparatus according to claim 3, wherein the first roller is provided with a plurality of sipes each having a predetermined depth from a roller surface.

5. The page pressing apparatus according to claim 4, wherein a bottom of each sipe is formed into an R shape.

6. The page pressing apparatus according to claim 5, further comprising:
   a second roller which has a diameter smaller than a diameter of the first roller, is constituted by a material whose elastic deformability is lower than an elastic deformability of the first roller, and rotates around the rotation axis,
   wherein the first roller is elastically deformed by the predetermined pressing load such that the second roller presses the page pressed by the first roller.

7. The page pressing apparatus according to claim 6, further comprising:
   a torque limiting function member which is provided between the second roller and the rotation axis and limits a rotation torque from the rotation axis when a load torque equal to or more than a predetermined load torque is applied.

8. The page pressing apparatus according to claim 7, wherein the catching section, the first roller, and the second roller are located adjacent to one another at predetermined intervals in descending order of outer diameter.

9. The page pressing apparatus according to claim 1, wherein the first roller is constituted by a sponge-like material which is elastically deformed by the predetermined pressing load.

10. The page pressing apparatus according to claim 9, further comprising:
    a second roller which has a diameter smaller than a diameter of the first roller, is constituted by a material whose elastic deformability is lower than an elastic deformability of the first roller, and rotates around the rotation axis,
    wherein the first roller is elastically deformed by the predetermined pressing load such that the second roller presses the page pressed by the first roller.

11. The page pressing apparatus according to claim 10, further comprising:
    a torque limiting function member which is provided between the second roller and the rotation axis and limits a rotation torque from the rotation axis when a load torque equal to or more than a predetermined load torque is applied.

12. The page pressing apparatus according to claim 11, wherein the catching section, the first roller, and the second roller are located adjacent to one another at predetermined intervals in descending order of outer diameter.

13. The page pressing apparatus according to claim 1, wherein the first roller is provided with a plurality of sipes each having a predetermined depth from a roller surface.

14. The page pressing apparatus according to claim 13, further comprising:
    a second roller which has a diameter smaller than a diameter of the first roller, is constituted by a material whose elastic deformability is lower than an elastic deformability of the first roller, and rotates around the rotation axis,
    wherein the first roller is elastically deformed by the predetermined pressing load such that the second roller presses the page pressed by the first roller.

15. The page pressing apparatus according to claim 14, further comprising:
    a torque limiting function member which is provided between the second roller and the rotation axis and limits a rotation torque from the rotation axis when a load torque equal to or more than a predetermined load torque is applied.

16. The page pressing apparatus according to claim 15, wherein the catching section, the first roller, and the second roller are located adjacent to one another at predetermined intervals in descending order of outer diameter.

17. The page pressing apparatus according to claim 1, further comprising:
    a second roller which has a diameter smaller than a diameter of the first roller, is constituted by a material whose elastic deformability is lower than an elastic deformability of the first roller, and rotates around the rotation axis,
    wherein the first roller is elastically deformed by the predetermined pressing load such that the second roller presses the page pressed by the first roller.

18. The page pressing apparatus according to claim 17, further comprising:
    a torque limiting function member which is provided between the second roller and the rotation axis and limits a rotation torque from the rotation axis when a load torque equal to or more than a predetermined load torque is applied.

19. The page pressing apparatus according to claim 18, wherein the catching section, the first roller, and the second roller are located adjacent to one another at predetermined intervals in descending order of outer diameter.

20. A document camera system comprising:
a page turning apparatus which turns pages of a book in a double-page spread state;
a page pressing apparatus including a roller which rotates around a rotation axis and presses a page fed to a page-turning end point with a predetermined pressing load, and a catching section which is arranged at a position in an axis direction of the rotation axis with respect to the first roller and catches the page so as to feed the page to the page-turning end point by causing a plurality of vane sections arranged around the rotation axis to rotate around the rotation axis; and
a control apparatus which repeats an operation of controlling an imaging section to photograph a page of the book in synchronization with timing of turning the page.

\* \* \* \* \*